United States Patent [19]
Böhm et al.

[11] 3,992,509
[45] Nov. 16, 1976

[54] PRODUCTION OF DISULFUR DICHLORIDE

[75] Inventors: Benno Böhm; Klaus Velleman, both of Leverkusen, Germany

[73] Assignee: Bayer Aktiengesellschaft, Leverkusen, Germany

[22] Filed: Mar. 18, 1975

[21] Appl. No.: 559,472

[30] Foreign Application Priority Data
Mar. 30, 1974 Germany.......................... 2415601

[52] U.S. Cl................................. 423/469; 423/568
[51] Int. Cl.².......................................... C01B 17/45
[58] Field of Search............................ 423/469, 568

[56] References Cited
UNITED STATES PATENTS

| | | | |
|---|---|---|---|
| 875,231 | 12/1907 | Acker | 423/469 |
| 1,341,423 | 5/1920 | Gegenheimer et al. | 423/469 |
| 1,864,290 | 6/1932 | Bacon et al. | 423/568 |
| 3,205,040 | 9/1969 | Schmadebeck | 423/469 X |

FOREIGN PATENTS OR APPLICATIONS 190,995   1/1923   United Kingdom................. 423/469

*Primary Examiner*—Edward Stern
*Attorney, Agent, or Firm*—Burgess, Dinklage & Sprung

[57] ABSTRACT

A process for the production of disulfur dichloride comprising establishing a molten mass of sulfur at a temperature of about 200° to 300° C, continuously introducing chlorine into said mass at a rate such that there is always an excess of sulfur in said mass, continuously withdrawing disulfur dichloride vapor from above said mass, and condensing said disulfur dichloride vapor. Advantageously the temperature is about 220° to 260° C, the pressure is at or near atmospheric pressure and sulfur and chlorine are added to the molten mass at about the same rate they are withdrawn therefrom in the form of disulfur dichloride. An apparatus is also described.

1 Claim, 1 Drawing Figure

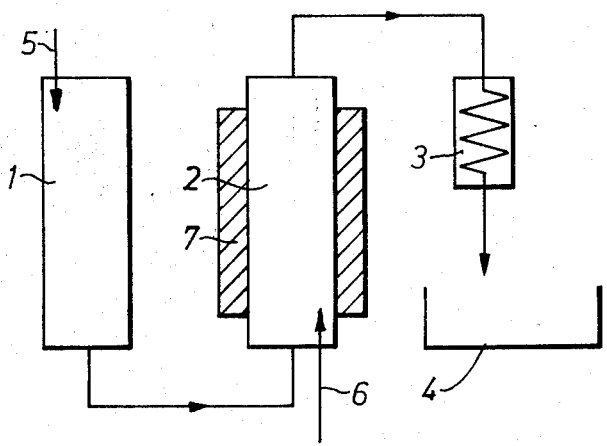

PRODUCTION OF DISULFUR DICHLORIDE

This invention relates to a simple process and to an apparatus for the continuous production of disulfur dichloride.

Among the possible methods for producing disulfur dichloride, only those in which the elements, sulfur and chlorine, are used as starting materials, have hitherto acquired any commercial significance. Although the reaction takes place smoothly, considerable difficulties are involved in working up the reaction product. Thus, sulfur dichloride and even sulfur tetrachloride are formed in addition to the required product, depending upon the reaction conditions. Another difficulty is the relatively high solubility (more than 66%) of sulfur in disulfur dichloride. Accordingly, purification by distillation is seriously complicated because disulfur dichloride in the gaseous phase enters the following disproportionation equilibrium:

$$S_2Cl_2 \rightleftarrows SCl_2 + S$$

Thus, the distillation of a reaction mixture of stoichiometric quantities of sulfur and chlorine produces a red preliminary fraction heavily contaminated with monosulfur dichloride, and a sulfur-containing subsequent fraction.

German Pat. No. 368,160 describes a process in which chlorine is introduced into molten sulfur and the reaction vessel is maintained at a constant level by continuously topping it up with sulfur in order to prevent the chlorine from breaking through. In order to obtain a useable product, the reaction product is removed from the reaction mixture under reduced pressure with the result that the reaction cannot readily be controlled with any degree of precision. In addition, the continuous introduction of sulfur in vacuo involves additional outlay in terms of apparatus.

The object of the present invention is to provide a process for the continuous production of disulfur dichloride which directly gives high yields of a highly pure product in a technically simple manner without any need for an additional purification stage, more especially a vacuum distillation stage.

According to the invention, this object is achieved by a process comprising establishing a molten mass of sulfur at a temperature of about 200° to 300° C, and at or near atmospheric pressure continuously introducing chlorine into said mass at a rate such that there is always an excess of sulfur in said mass, continuously withdrawing disulfur chloride vapour from above said mass, and condensing said disulfur dichloride vapor.

On the basis of the prior art, it would have been expected that a disulfur dichloride contaminated with secondary products would be formed to an increasing extent with increasing temperature.

Accordingly, it was particularly surprising to find that a highly pure disulfur dichloride could be obtained by distilling off the product from the reaction mixture under normal pressure and at relatively high temperatures.

In the process according to the invention, chlorine is continuously introduced into liquid sulfur in at most as large a quantity as the melt is able to take up at the particular temperatures prevailing. By heating or cooling the reaction vessel in the liquid phase, it is possible to maintain a temperature which is optimum both for the formation of disulfur dichloride and for the immediate removal of the disulfur dichloride from the reaction mixture. The volatile disulfur dichloride is directly condensed without rectification.

A satisfactory procedure is obtained when the temperature prevailing in the reactor ranges from about 200° to 300° C. The reaction is preferably carried out at a temperature ranging from about 220° to 260° C (cf. boiling point of disulfur dichloride 137° C). The height of the sulfur pool above the point of introduction of chlorine ranges from about 50 to 200 centimeters and preferably is at least about 130 centimeters.

In order to catalyze the reaction, iodine, iron or antimony compounds (cf. German Pat. No. 368,160) may optionally be added.

Accordingly, the advantages afforded by the invention are as follows: highly pure disulfur dichloride can be obtained by a highly reliable process which involves very little labor without any need for a vacuum distillation stage, as in the prior art, a pure product being directly obtained from the reaction mixture in a single process stage.

The invention also includes an apparatus for continuously carrying out the process according to the invention, a preferred embodiment of which is described and explained in regard to its mode of operation hereinbelow with reference to the accompanying drawing which is a schematic elevation and in which the references have the following meaning:

1. Sulfur storage vessel
2. Reaction vessel
3. Condenser
4. Receiver for disulfur dichloride
5. Sulfur inlet
6. Inlet pipe for chlorine
7. Heating and cooling jacket The apparatus consists essentially of two vessels, a reaction vessel 2 and a storage vessel 1, also referred to as a level vessel, which communicate with one another through a pipe at their lower ends. Chlorine is introduced through one or, optionally, several inlets 6 at the bottom of the reaction vessel. The reaction vessel is closed at its upper end and connected through a pipe to a condenser 3 which opens into a receiver 4. The reaction vessel is surrounded by a heating and cooling jacket 7. The inlet for sulfur 5 is arranged in the open storage vessel 1.

In one preferred embodiment of the process according to the invention, liquid sulfur is introduced at the upper end of the storage vessel 1, so that a certain level is reached both in the storage vessel 1 and in the reaction vessel 2. For the continuous production of disulfur dichloride, chlorine gas is introduced through the inlet 6 and the reaction vessel 2 is kept at a constant level by continuously topping up the storage vessel with sulfur. Sulfur dichloride is removed from the reaction mixture as it is formed, condensed through a condenser 3 and collected in a receiver 4. The energy required for removing the product is controlled, in particular, by the heat of reaction and, optionally, by a heating or cooling jacket 7 surrounding the reaction vessel. It has been found that the reaction can be carried out with advantage at a temperature ranging from about 200° to 300° C and, preferably, at a temperature ranging from about 220° to 260° C. The quantity of disulfur dichloride produced can be adjusted within wide limits through the quantity of chlorine introduced provided that, at the same time, the continuous introduction of sulfur is kept at an adequate level. If liquid chlorine is used instead of gaseous chlorine, it may be possible to dispense with the need to cool the reactor 2 depending upon the other reaction conditions (heat insulation of the reaction vessel and quantities reacted, etc.). The sulfur is either introduced into the storage vessel 1 in liquid form or, alternatively, is directly melted in that vessel. It is of course also possible in accordance with the invention to introduce the sulfur directly into the reaction vessel 2.

Accordingly, the advantages afforded by the process according to the invention are as follows: there is no need for pressure or vacuum systems because the disulfur dichloride distills off from the reactor without decomposing at elevated temperatures. Accordingly, the sulfur can also be introduced into an open system. The process involves very little labor and is distinguished by a high degree of reliability. It gives high volume-time yields of a highly pure disulfur dichloride which may be used above all as a starting material in the manufacture of oil additives, for vulcanization in the rubber industry and for the production of thionyl chloride.

The invention is illustrated by the following examples, which were carried out at normal pressure (atmospheric pressure).

Example 1 shows how the composition of the condensate is governed by the temperature prevailing in the liquid chlorination mixture. Example 2 shows the results obtained with a practical embodiment.

EXAMPLE 1

Liquid sulfur was introduced into a laboratory-scale glass apparatus which consisted of two 60 mm diameter, 400 mm long glass tubes which communicate with one another at their lower ends through a large diameter glass tube. During the test, the sulfur filling level was kept constant by the continuous introduction of sulfur into one of the glass tubes. Chlorine gas was then blown continuously into the other reaction tube. The temperature prevailing in the liquid of the reaction tube was measured and kept constant by heating. The vapors given off were carried off into a condenser where they were liquefied. The condensate was measured and subjected to a chlorine and sulfur analysis. The results of the test series are summarized in the following table:

| Test No. | Chlorine gas g/h ± 2% | Reactor temperature ° C | g/h | Condensate excess $S_2Cl_2$ % | S % | $Cl_2$ % |
|---|---|---|---|---|---|---|
| 1.1 | 260 | 160 | 101 | 84.8 | — | 15.2 |
| 1.2 | 260 | 180 | 526 | 88.4 | — | 11.6 |
| 1.3 | 260 | 200 | 490 | 92.5 | — | 7.5 |
| 1.4 | 260 | 220 | 493 | 97.1 | — | 2.9 |
| 1.5 | 260 | 250 | 481 | 99.9 | 0.1 | — |
| 1.6 | 260 | 280 | 513 | 96.5 | 3.5 | — |
| 1.7 | 430 | 250 | 808 | 99.95 | — | 0.05 |

EXAMPLE 2

A cylindrical reactor 50 cm in diameter and 200 cm tall was connected at its lower end to a vessel situated at the same level which was filled with liquid sulfur. During production, a constant level of 50% was maintained in the sulfur vessel by the inflow of liquid sulfur. 50 m³/h of chlorine were blown continuously into the lower part of the reactor, and the temperature in the liquid phase of the reactor was maintained at around 240° C by heating or cooling. Highly pure disulfur dichloride distilled off at a rate of approximately 300 kg per hour, being condensed in the following condenser. Analysis of the product by gas chromatography produced the following results:

0.01 % of unknown
0.01 % of $SO_2$
0.08 % of $SCl_2$
0.05 % of unknown
0.02 % of $SOCl_2$
99.8 % of $S_2Cl_2$ It will be appreciated that the instant specification and examples are set forth by way of illustration and limitation, and that various modifications and changes may be made without departing from the spirit and scope of the present invention.

What is claimed is:

1. A process for the production of disulfur dichloride comprising establishing a molten mass of sulfur at a temperature of about 220° to 260° C and atmospheric pressure, continuously introducing chlorine into said mass at a point from about 50 to 200 cm below the top of the melt, continuously withdrawing disulfur dichloride vapor from above said mass, the sulfur and chlorine being added to said mass at about the rate at which they are withdrawn therefrom in the form of disulfur dichloride and at a rate such that there is always an excess of sulfur in said mass, and condensing said disulfur dichloride vapor.

* * * * *